US011899755B2

(12) United States Patent
Spahr et al.

(10) Patent No.: US 11,899,755 B2
(45) Date of Patent: Feb. 13, 2024

(54) VIRTUAL MUSIC RIGHTS MANAGEMENT

(71) Applicants: Sony Group Corporation, Tokyo (JP); Sony Music Entertainment, New York, NY (US)

(72) Inventors: Bradley Spahr, Redondo Beach, CA (US); Thomas Sachson, Malibu, CA (US)

(73) Assignees: Sony Group Corporation, Tokyo (JP); Sony Music Entertainment, New York, NY (US)

( * ) Notice: Subject to any disclaimer, the term of this patent is extended or adjusted under 35 U.S.C. 154(b) by 234 days.

(21) Appl. No.: 17/324,604

(22) Filed: May 19, 2021

(65) Prior Publication Data
US 2021/0365527 A1 Nov. 25, 2021

Related U.S. Application Data

(60) Provisional application No. 63/044,709, filed on Jun. 26, 2020, provisional application No. 63/027,794, filed on May 20, 2020.

(51) Int. Cl.
*G06F 21/62* (2013.01)
*G06F 21/60* (2013.01)
(Continued)

(52) U.S. Cl.
CPC ............ *G06F 21/10* (2013.01); *G06F 16/635* (2019.01); *G06F 16/2379* (2019.01);
(Continued)

(58) Field of Classification Search
CPC ............. G06F 16/2379; G06F 16/9535; G06F 16/635; G06F 21/10
(Continued)

(56) References Cited

U.S. PATENT DOCUMENTS 3,744,803 A 7/1973 Bazzy
6,119,229 A 9/2000 Martinez
(Continued)

FOREIGN PATENT DOCUMENTS

| CN | 107852573 A | * | 3/2018 | .......... G06T 19/006 |
|----|---|---|---|---|
| EP | 715243 A1 | | 8/2003 | |

(Continued)

OTHER PUBLICATIONS

C. Drews and F. Pestoni, "Virtual jukebox: reviving a classic," Proceedings of the 35th Annual Hawaii International Conference on System Sciences, 2002, pp. 887-893, doi: 10.1109/HICSS.2002. 994055.

(Continued)

*Primary Examiner* — Haresh N Patel
(74) *Attorney, Agent, or Firm* — Procopio, Cory, Hargreaves & Savitch LLP

(57) ABSTRACT

Management of virtual content rights of digital assets for a virtual environment, including: receiving data indicating a request from a user for assignment of virtual content rights of a digital asset; determining whether the requested virtual content rights are available for assignment to the user and a set of terms of the assignment for the requested virtual content rights; notifying the user of the availability and the set of terms for the assignment of the virtual content rights to the user; receiving data indicating agreement by the user to the assignment, including agreement to at least one term of the set of terms; and updating the virtual content rights database to indicate the assignment of the virtual content rights to the user.

20 Claims, 9 Drawing Sheets

(51) Int. Cl.
*G06F 21/10* (2013.01)
*G06F 16/635* (2019.01)
*G06F 16/23* (2019.01)
*G06F 16/9535* (2019.01)
*G06Q 30/0207* (2023.01)
*H04L 67/01* (2022.01)

(52) U.S. Cl.
CPC ...... *G06F 16/9535* (2019.01); *G06F 21/1015* (2023.08); *G06F 21/1075* (2023.08); *G06F 2221/2141* (2013.01); *G06Q 30/0222* (2013.01); *H04L 67/01* (2022.05)

(58) Field of Classification Search
USPC .......................................................... 726/28
See application file for complete search history.

(56) References Cited

U.S. PATENT DOCUMENTS

| | | | |
|---|---|---|---|
| 7,031,943 | B1 | 4/2006 | James et al. |
| 10,430,559 | B2 | 10/2019 | Anantharaman |
| 10,628,392 | B1 | 4/2020 | Charytoniuk et al. |
| 10,715,851 | B1 | 7/2020 | Shankar |
| 11,565,184 | B1* | 1/2023 | Linden .................... A63F 13/65 |
| 2001/0018667 | A1 | 8/2001 | Kim |
| 2001/0037316 | A1 | 11/2001 | Shiloh |
| 2002/0038221 | A1 | 3/2002 | Tiwary et al. |
| 2002/0184515 | A1 | 12/2002 | Oho et al. |
| 2006/0143236 | A1 | 6/2006 | Wu |
| 2006/0195376 | A1 | 8/2006 | Jung |
| 2007/0106551 | A1 | 5/2007 | McGucken |
| 2007/0156697 | A1 | 7/2007 | Tsarkova |
| 2008/0046222 | A1 | 2/2008 | Van Luchene |
| 2008/0060084 | A1 | 3/2008 | Gappa et al. |
| 2008/0221998 | A1 | 9/2008 | Mendelsohn et al. |
| 2008/0250315 | A1 | 10/2008 | Eronen |
| 2009/0054157 | A1 | 2/2009 | Hamilton, II |
| 2009/0099919 | A1 | 4/2009 | Schultheiss |
| 2009/0313556 | A1 | 12/2009 | Hamilton, II |
| 2010/0018382 | A1 | 1/2010 | Feeney |
| 2010/0125529 | A1* | 5/2010 | Srinivasan ............. G06Q 30/02 705/317 |
| 2010/0235292 | A1 | 9/2010 | Jung |
| 2011/0087552 | A1 | 4/2011 | Carver |
| 2011/0210962 | A1 | 9/2011 | Horan |
| 2012/0101886 | A1 | 4/2012 | Subramanian et al. |
| 2012/0231441 | A1 | 9/2012 | Parthasarathy et al. |
| 2013/0333055 | A1* | 12/2013 | Pallakoff ................ H04L 63/10 726/29 |
| 2014/0096263 | A1 | 4/2014 | Mallardo |
| 2014/0101778 | A1 | 4/2014 | Davidson |
| 2014/0119580 | A1* | 5/2014 | Osada ..................... H04S 7/303 381/300 |
| 2014/0171191 | A1* | 6/2014 | Cox ....................... A63F 13/497 463/31 |
| 2014/0229850 | A1 | 8/2014 | Makofsky et al. |
| 2015/0310497 | A1 | 1/2015 | Valin et al. |
| 2015/0098597 | A1* | 4/2015 | Kulavik .................. H04S 3/004 381/309 |
| 2015/0205971 | A1 | 7/2015 | Sanio et al. |
| 2015/0254056 | A1 | 9/2015 | Walker |
| 2015/0278820 | A1* | 10/2015 | Meadows ............... G06F 21/32 705/64 |
| 2015/0286276 | A1 | 10/2015 | Harrell, Jr. |
| 2017/0180288 | A1 | 6/2017 | Barbour et al. |
| 2017/0200195 | A1* | 7/2017 | Kugler ............... G06Q 30/0233 |
| 2019/0318060 | A1 | 10/2019 | Brenner |
| 2019/0318348 | A1* | 10/2019 | Brenner ............... G06Q 50/184 |
| 2020/0073482 | A1 | 3/2020 | Levesque |
| 2020/0143012 | A1 | 5/2020 | Tardelli et al. |
| 2020/0353362 | A1 | 11/2020 | Sachson |
| 2020/0106144 | A1 | 12/2020 | Schmitt et al. |
| 2021/0321061 | A1 | 10/2021 | Kawakami |
| 2021/0321170 | A1* | 10/2021 | MacDougall .... H04N 21/44222 |

FOREIGN PATENT DOCUMENTS

| | | |
|---|---|---|
| JP | 2007167383 A | 7/2007 |
| JP | 2014-500545 A | 1/2014 |
| JP | 2022529028 A | 6/2022 |
| KR | 20100073549 A | 7/2010 |
| WO | 2014006886 A1 | 1/2014 |
| WO | 2018235607 A1 | 12/2018 |
| WO | WO-2020061132 A1 | 3/2020 |

OTHER PUBLICATIONS

Grindley, P. (2018). Cross-Licensing. In: Augier, M., Teece, D.J. (eds) The Palgrave Encyclopedia of Strategic Management, Palgrave Macmillan, London, https://doi.org/10.1057/978-1-137-00772-8_771.

K. Hill, "A perspective: the role of identifiers in managing and protecting intellectual property in the digital age," in Proceedings of the IEEE, vol. 87, No. 7, pp. 1228-1238, Jul. 1999, doi: 10.1109/5.771074.

M. Hopmann, D. Thalmann and F. Vexo, "Virtual Shelf: Sharing Music Between People and Devices," 2010 International Conference on Cyberworlds, 2010, pp. 53-59, doi: 10.1109/CW.2010.35.

Entropi Games, Master the art of Djing in VR, Vinyl Reality—DJ in VR, Nov. 16, 2017, pp. 1-7, EntroPi Games.

* cited by examiner

VIRTUAL MUSIC RIGHTS MANAGEMENT

CROSS-REFERENCE TO RELATED APPLICATIONS

This application claims the benefits of priority under 35 U.S.C. § 119(e) of U.S. Provisional Patent Application No. 63/027,794, filed May 20, 2020, entitled "Mix Tapes in Virtual Reality Environment" and U.S. Provisional Patent Application No. 63/044,709, filed Jun. 26, 2020, entitled "Virtual Content Management." The disclosures of the above-referenced applications are incorporated herein by reference.

BACKGROUND

Field

The present disclosure relates to virtual music rights management, and more specifically, to managing digital asset management within virtual music-themed environment.

Background

Currently, managing song rights in virtual environment is not clear. Thus, need exists for the management of digital assets within virtual music-themed environment.

SUMMARY

The present disclosure is directed to managing digital assets within virtual music-themed environment.

In one aspect, a method for management of virtual content rights of digital assets for a virtual environment is disclosed. The method includes: receiving, at a platform administrator server, data indicating a request from a user for assignment of virtual content rights of a digital asset; determining, by the platform administrator server, whether the requested virtual content rights are available for assignment to the user and a set of terms of the assignment for the requested virtual content rights, where the platform administrator server accesses a virtual content rights database storing data associating users of a digital content engagement platform with virtual content rights acquired with respect to digital assets and storing data indicating terms for assigning virtual content rights; notifying, by the platform administrator server, the user of the availability and the set of terms for the assignment of the virtual content rights to the user; receiving, by the platform administrator server, data indicating agreement by the user to the assignment, including agreement to at least one term of the set of terms; and updating, by the platform administrator server, the virtual content rights database to indicate the assignment of the virtual content rights to the user.

In one implementation, the set of terms include a duration of the assignment, and updating the virtual content rights database includes updating data to indicate the duration of the assignment included in the set of terms. In one implementation, the method further includes receiving, by the platform administrator server, data from the user indicating which of the terms in the set of terms are acceptable to the user as consideration for assigning the virtual content rights; sending, by the platform administrator server to the user, data representing a digital contract based on the terms indicated to be acceptable to the user, the digital contract providing for assignment of the virtual content rights to the user in accordance with one or more of the accepted terms; where receiving data indicating agreement by the user to the assignment includes data indicating agreement by the user to the digital contract. In one implementation, the virtual content rights for a digital asset include an administrative right that grants the user a right to set permissions for how that digital asset can be used in the platform. In one implementation, the virtual content rights for a digital asset include a reward right that indicates a reward the user receives when that digital asset is used in the platform. In one implementation, the virtual content rights for a digital asset include a scarcity right that indicates to how many users that virtual content rights for that digital assets can be assigned. In one implementation, the digital asset is a music-related digital asset including music-related audio, music-related video, music-related static images including photos, paintings, and digitized art in the digital content engagement platform. In one implementation, sharing, viewing, and listening to the music-related digital asset by creating virtual rights to the music-related digital asset. In one implementation, the virtual rights are at least one of created, acquired, traded, assigned, and licensed. In one implementation, a title holder of the virtual rights is rewarded with a reward. In one implementation, the reward includes one of moving up levels as a system user or receiving points. In one implementation, the method further includes promoting competitive incentive to be the title holder of the virtual rights to one of a popular song or music video within the virtual environment. In one implementation, promoting the competitive incentive includes: providing an incentive for the user to come into the virtual environment to be the title holder of the virtual rights to one virtual title available for the popular song or music video. In one implementation, the virtual rights include a limited number of ownership slots available within the virtual environment.

In another aspect, a method of managing music rights for a virtual environment is disclosed. The method includes: retrieving character information from a character database, where the character information is associated with an acquiring character associated with a virtual environment, and the character information includes character rights information; retrieving music information from a music database, where the music information is associated with a song, and the music information includes music rights information; updating the character rights information based on the music information; updating the music rights information based on the character information; receiving first user action information from a first client through a network, where the first user action information indicates the song, and where the first client is associated with a first user; updating the character information based on the first user action information; sending the updated character information to a second client through the network, where the second client is associated with a second user.

In one implementation, the character information includes rewards information, and where updating the character information includes updating the rewards information. In one implementation, the character information includes maximum rights information indicating a maximum number of songs that can have music rights information associated with the character information. In one implementation, the music information includes rights expiration information indicating at least one time and at least one song. In one implementation, the first user action information includes information indicating that the first user has requested access to music audio information for the song. In one implementation, the method further includes retrieving character information from a character database, where the character information is associated with a receiving character associated with the virtual environment, and the character information includes character rights information; updating the character information associated with the acquiring character to remove music rights information associated with the song; updating the character information associated with the receiving character to add music rights information associated with the song.

Other features and advantages should be apparent from the present description which illustrates, by way of example, aspects of the disclosure

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

Figure 1:
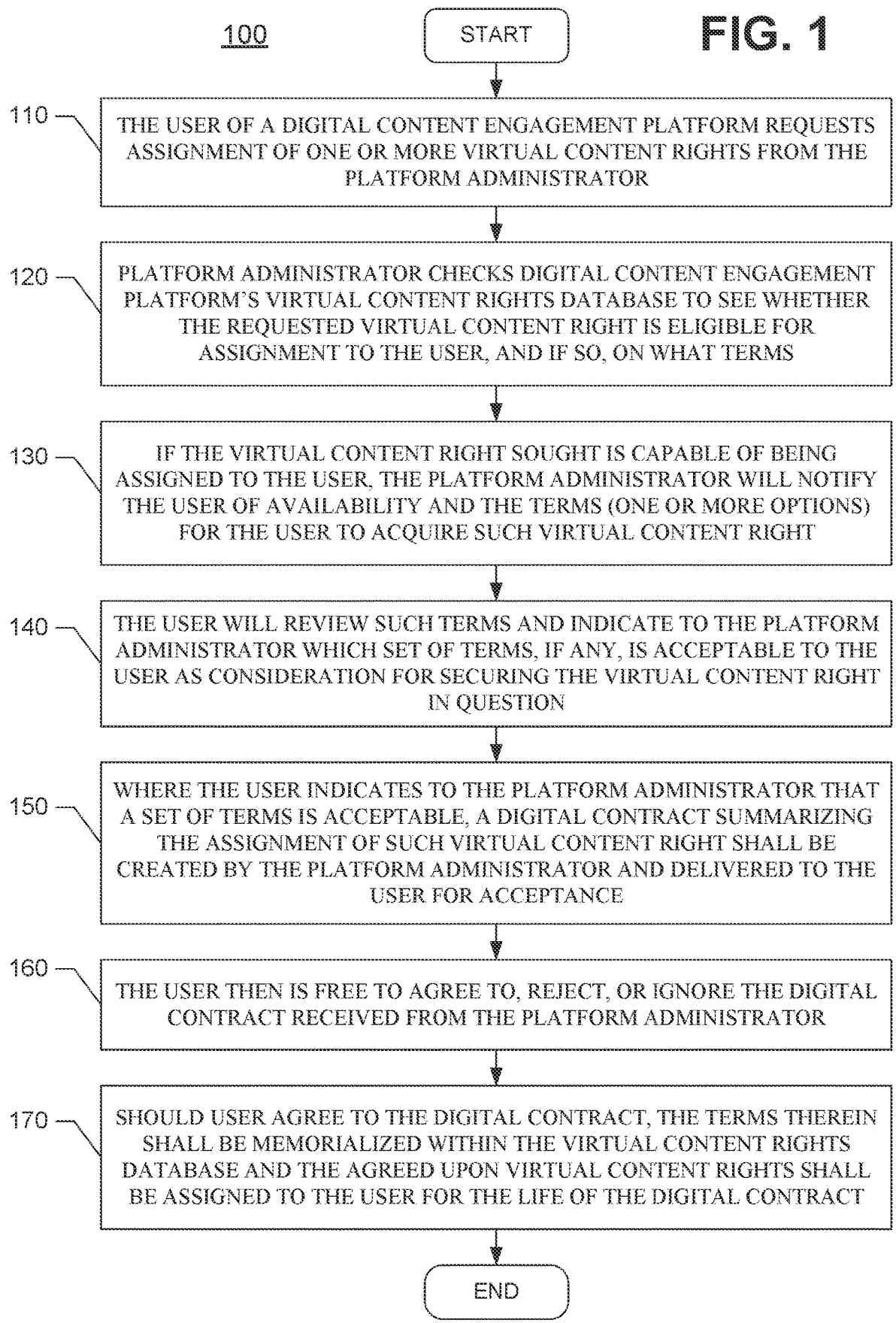
FIG. 1 shows an overview of steps involved with a user request to a platform administrator server.

The present disclosure is directed to managing digital asset management within virtual music-themed environment. In one implementation, a technique for managing and using content as digital assets in a networked environment is disclosed. In another implementation, a networked computer system provides a game framework across a music-themed virtual world. The game framework provides mechanisms to manage access to digital assets representing content, such as music, images, and/or video. In one implementation, multiple users access the game framework to interact with each other and digital assets, such as sharing or exchanging assets, and acquiring and competing for assets. An example of the game framework referred to as "Song Guardian" is discussed in the following pages.

Features provided in implementations can include, but are not limited to, one or more of the following items:

Acquiring rights to assets

Sharing or exchanging rights to assets

Acquiring additional rights or assets from the use of existing assets, such as virtual currency royalties or points for use of a song asset Social interaction between users, supplemented by suggestion, profile and activity searching In one implementation, the present disclosure relates to computer-implemented systems and methods for creating, transferring and managing music-related digital assets, and more particularly to computer-implemented systems and methods of creating, transferring and managing virtual content rights associated with music-related digital assets such as music-related audio or video recordings, virtual mixed music tapes or playlists, music-related static images such as photos, paintings, and digitized art, etc., in a multiuser music-related digital content engagement platform.

In at least one implementation, the system improves over existing multiuser media platforms such as online digital database and streaming services that involve the listening, sharing and viewing of music and other music-related digital content, by creating "virtual rights" to the underlying music-related digital content to be interacted with, where the virtual rights can be created, acquired, traded, assigned, licensed, etc. Such a system thereby provides motivation for users to enter, use, and stay engaged with the multiuser music-related digital content platform and also helps users become educated as to how music-related digital asset creation, ownership, transfer, and licensing may be accomplished in the real world as to actual underlying assets.

For example, in such a system involving songs and/or music videos as the music-related digital content, every song and/or music video can be provided with a single virtual title holder held by a unique user of the system. To acquire the asset, a user can enter the system, search for a song, and then decide to acquire the virtual title to the song. The user can then use the platform to acquire the virtual title to this song, such as by use of virtual currency, trades, credits, etc., and would then subsequently be listed as the virtual title holder of the music-related digital content in the system. For motivation to stay engaged with and use the system, so long as the user continues to come back into the system, the user can continue to retain the virtual title, but if the user fails to come back into the system, then the virtual title to that song may be released back to the community where other users can then acquire it.

In one aspect of the present disclosure, only one user can claim virtual title to a music-related digital asset such as a song. Namely, if User A has the virtual title to Song 1, and then another User B who seeks to acquire title to Song 1 cannot do so, at the moment, because User B would see that User A is the holder of the virtual title. User B, however, may be provided with options such as (1) making an offer to User A to acquire the virtual title to the song; (2) join a waiting list to have the opportunity to acquire the virtual title should User A allow it to expire, or (3) do nothing.

In one aspect, a user's ownership of virtual title to a music-related digital asset such as a song would not restrict other users from playing the song, as it would still be playable like any other song. Owners could also build their own "music rooms" (e.g., a virtual room called say "User A's Music Listening Room") and make the song available in that virtual room, or it could be located into a themed listening room matching the genre of the song.

In one aspect of the system, every time a titled song is played anywhere in the system, the title holder would get rewarded, such as moving up levels as a system user or receiving points or other rewards. Thus, with the present system there is competitive incentive to have the virtual title to popular songs and/or music videos within the system. As new songs and/or music videos are released with the system, users can be motivated to come into the system to try and acquire the one virtual title available for the song. For example, new releases from popular artists may be highly desirable to acquire.

In some aspects of the present system, limits can be placed on the number of songs and/or music videos a user can hold virtual title to, such as five songs and/or music videos. In one aspect, each music-related digital asset in the system has one virtual title holder who must be a user of the system. Alternatively, the system could allow a song to have multiple virtual title owners. For example, 100 users could be permitted to have the virtual title to a single song.

In at least one implementation, the system provides improvement over prior systems by using virtual content rights to music-related digital content to create competition, incentive, and envy among users to spur more usage and engagement within the system, and can create new ways to monetize user and super users or fans.

One aspect of the present disclosure provides a computer-implemented method for management of virtual content rights of music-related digital assets comprising: providing a virtual content rights database comprising data associating users of a music-related digital content engagement platform with users' virtual content rights acquired with respect to music-related digital assets; receiving, at a platform administrator server, data indicative of a request from a user for assignment of virtual content rights of a music-related digital asset; determining, by the platform administrator server, whether the requested virtual content rights are eligible for assignment to the user and the terms of the assignment if eligible; notifying, by the platform administrator server, the user of the availability and a set of terms for the user to acquire the virtual content rights, the terms including duration of the assignment; receiving, by the platform administrator server, data from the user indicative of which of the terms are acceptable to the user as consideration for securing the virtual content rights; sending, by the platform administrator server to the user, data representing a digital contract based on the terms indicated to be acceptable to the user, the digital contract providing for assignment of the virtual content rights to the user in accordance with one or more of the accepted terms; receiving, by the platform administrator server, data indicative of agreement by the user to the digital contract; and updating, by the platform administrator server, the virtual content rights database to indicate the assignment of the virtual content rights to the user for the duration specified in the digital contract.

Another aspect of the present disclosure provides a computer-implemented method for management of virtual content rights of music-related digital assets comprising: providing a user access portal for a user to interact with a music-related digital content engagement platform that includes a virtual content rights database comprising data associating users of the music-related digital content engagement platform with users' virtual content rights acquired with respect to music-related digital assets; sending request information entered by the user via the access portal to the platform administrator server, the request information including data representing a user request for assignment of virtual content rights of a music-related digital asset; receiving data via the access portal indicative of notification of the availability and a set of terms for the user to acquire the virtual content rights, the terms including duration of the assignment; sending acceptance information entered by the user via the access portal to the platform administrator server, the acceptance information including data representing which of the terms are acceptable to the user as consideration for securing the virtual content rights; receiving data via the access portal representing a digital contract based on the terms indicated to be acceptable to the user, the digital contract providing for assignment of the virtual content rights to the user in accordance with one or more of the accepted terms; and sending agreement information entered by the user via the access portal to the platform administrator server, the agreement information including data representing agreement by the user to the digital contract.

Basic method steps and variables involved in a user of a multiuser music-related digital content engagement platform seeking to obtain virtual content rights to a music-related digital asset are shown in FIG. 1 through FIG. 8. In one implementation, the platform provides a virtual environment. In one such implementation, the platform includes one or more servers for data processing and management, and for communication with clients and users, and one or more databases, such as a character database storing information about characters in the virtual environment, a music database storing information about songs and music rights or virtual content rights. In one implementation, a character database stores character rights information associated with a character indicating one or more rights associated with the character. In one implementation, a character database stores rewards information associated with a character indicating a reward to be received by the character. In another implementation, the character database stores maximum rights information associated with a character indicating the maximum number of rights or songs that can be assigned to the character. In one implementation, a music database stores rights expiration information associated with a song indicating a time or period of time when assigned rights for the song expire.

FIG. 1 shows an overview 100 of steps involved with a user request to a platform administrator server, including: Start virtual content right process; (110) the user of a music-related digital content engagement platform requests assignment of one or more virtual content rights from the platform administrator; (120) platform administrator checks music-related digital content engagement platform's virtual content rights database to see whether the requested virtual content right is eligible for assignment to the user, and if so, on what terms (sale, lease, in-kind exchange, user performance award, gift, etc.); (130) if the virtual content right sought is capable of being assigned to the user, the platform administrator will notify the user of availability and the terms (one or more options) for the user to acquire such virtual content right; (140) the user will review such terms and indicate to the platform administrator which set of terms, if any, is acceptable to the user as consideration for securing the virtual content right in question; (150) where the user indicates to the platform administrator that a set of terms is acceptable, a digital contract summarizing the assignment of such virtual content right shall be created by the platform administrator and delivered to the user for acceptance; (160) the user then is free to agree to, reject, or ignore the digital contract received from the platform administrator; (170) should user agree to the digital contract, the terms therein shall be memorialized within the virtual content rights database and the agreed upon virtual content rights shall be assigned to the user for the life of the digital contract; and stop virtual content right process.

Figure 2:
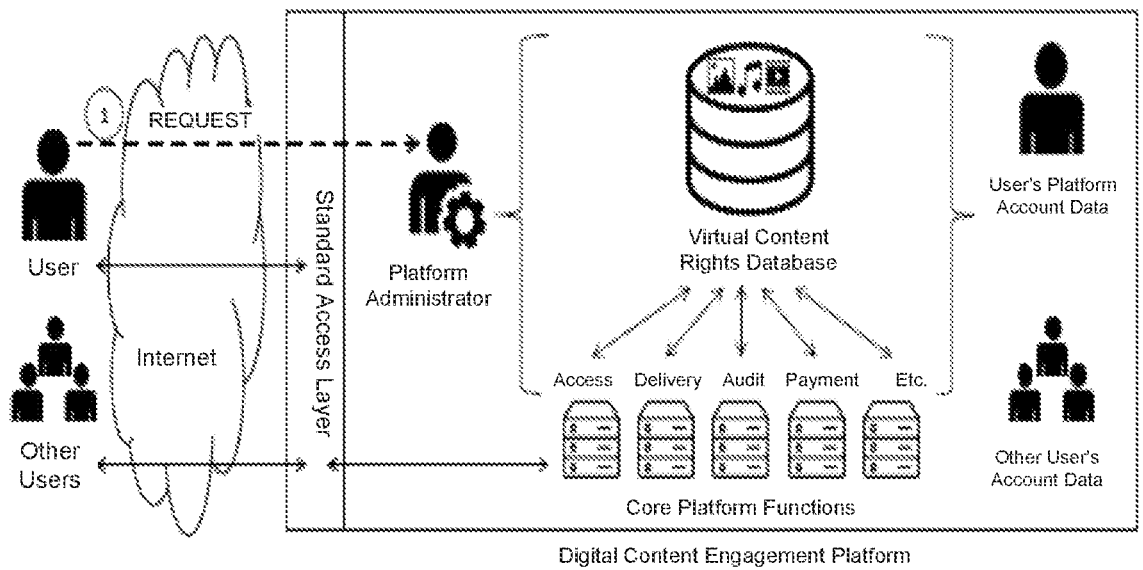
FIG. 2 illustrates step (110) of FIG. 1.

FIG. 2 illustrates step (110) of FIG. 1. In FIG. 2, the user of the music-related digital content engagement platform requests assignment of one or more virtual content rights from the platform administrator server. In one implementation, the "music-related digital content" includes music-related audio recordings (e.g., music), music-related video recordings (e.g., film, TV, web shows), music-related static imagery (e.g., photos, paintings, digitized art), music-related live streamed content, combinations of various mediums, music-related digital virtual real estate, music-related digital virtual goods, and analogous music-related digital content.

In one implementation, a "virtual content right" includes an appropriate right (whether partial to comprehensive) that the platform administrator may be permitted to "legally" assign, either permanently or temporarily, to the user, for consideration or otherwise. Examples of a virtual content right includes the right of the user to earn "in-platform" points or credits whenever another platform user engages with or consumes the associated content (e.g., another user listens to a song that the user has the virtual content right to).

Figure 3:
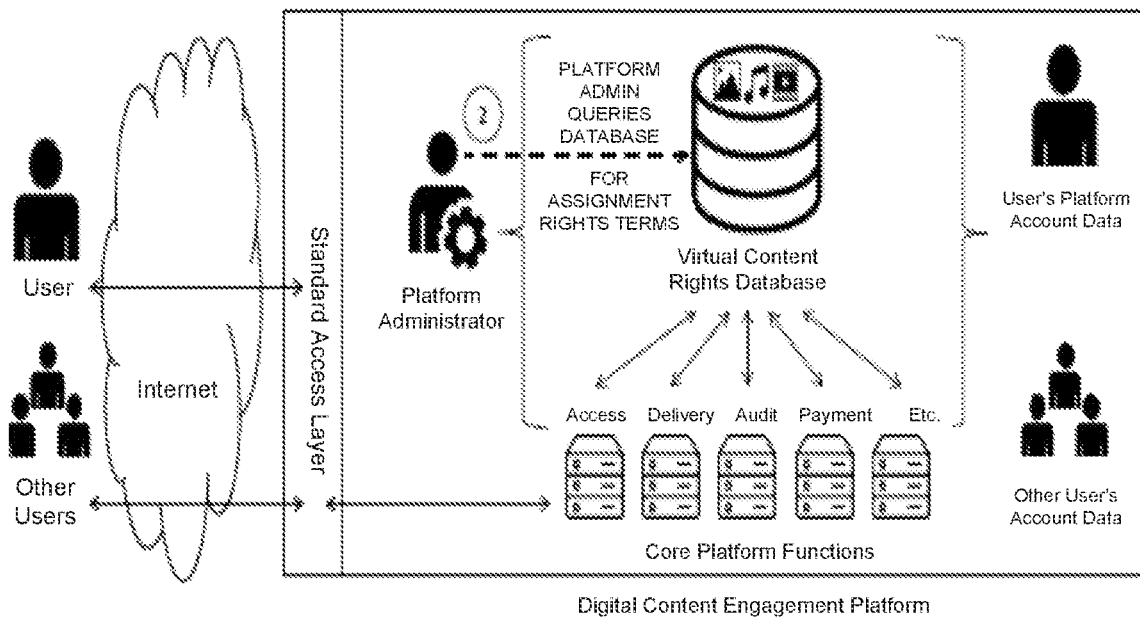
FIG. 3 illustrates step (120) of FIG. 1.

FIG. 3 illustrates step (120) of FIG. 1. In FIG. 3, the platform administrator checks music-related digital content engagement platform's virtual content rights database to see whether the requested virtual content right is eligible for assignment to the user, and if so, on what terms (sale, lease, in-kind exchange, user performance award, gift, etc.).

The terms may include, but are not limited to, the user paying a fee for perpetual or time limited rights over the use of the subject content, the user being assigned such subject rights as consideration for trading some other platform associated content right(s) previously assigned to the user by the platform administrator, the user being assigned such rights as a reward for partaking in a particular in-platform activity (e.g., winning a sweepstakes, viewing certain ads), the user being assigned such rights for any other reason the platform administrator deems appropriate in their discretion as platform administrator, or analogous situations meriting the assignment of such rights to the user.

The terms may reflect the requirements of the party controlling the virtual content right, which might be the platform administrator or another user.

Figure 4:
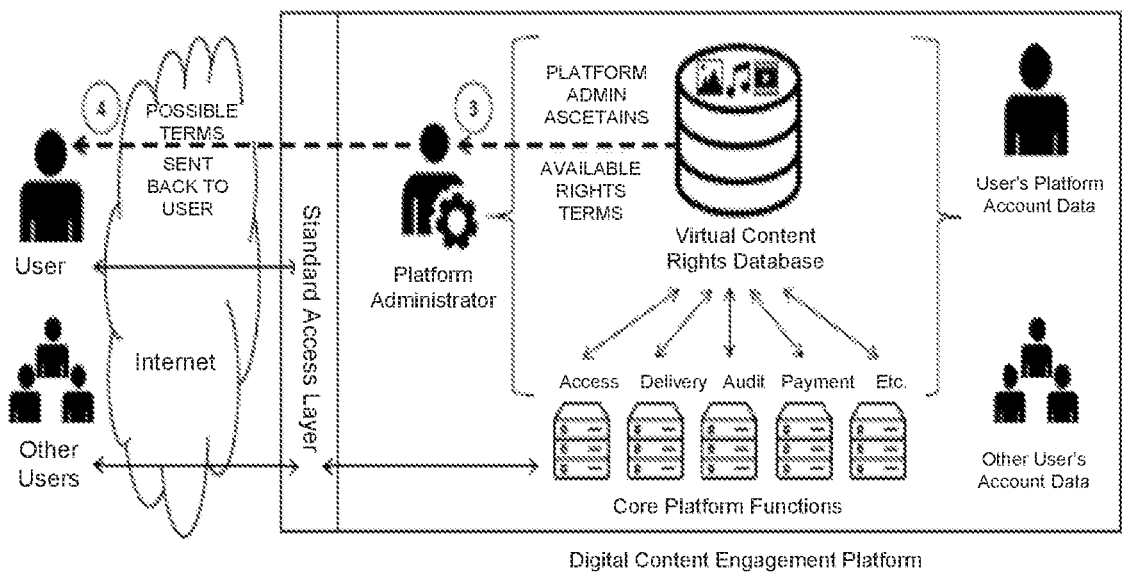
FIG. 4 illustrates step (130) of FIG. 1.

FIG. 4 illustrates step (130) of FIG. 1. In FIG. 4, if the virtual content right sought is capable of being assigned to the user, the platform administrator will notify the user of availability and the terms (one or more options) for the user to acquire such virtual content right.

The platform administrator may offer one or more options to the user, and may dynamically price such options. By way of example, the platform administrator might make the consideration vary depending on the time and manner the right is sought. Similarly, the platform administrator might offer the right to one user for consideration "x" and offering the same right to another user for consideration "y", with the delta being determined by the status of each user (one is a higher ranked user compared to the other).

It is also contemplated that the terms are not generated by the platform administrator, but by another user that holds the virtual content right in question (and are merely being delivered to the user by the platform administrator).

Figure 5:
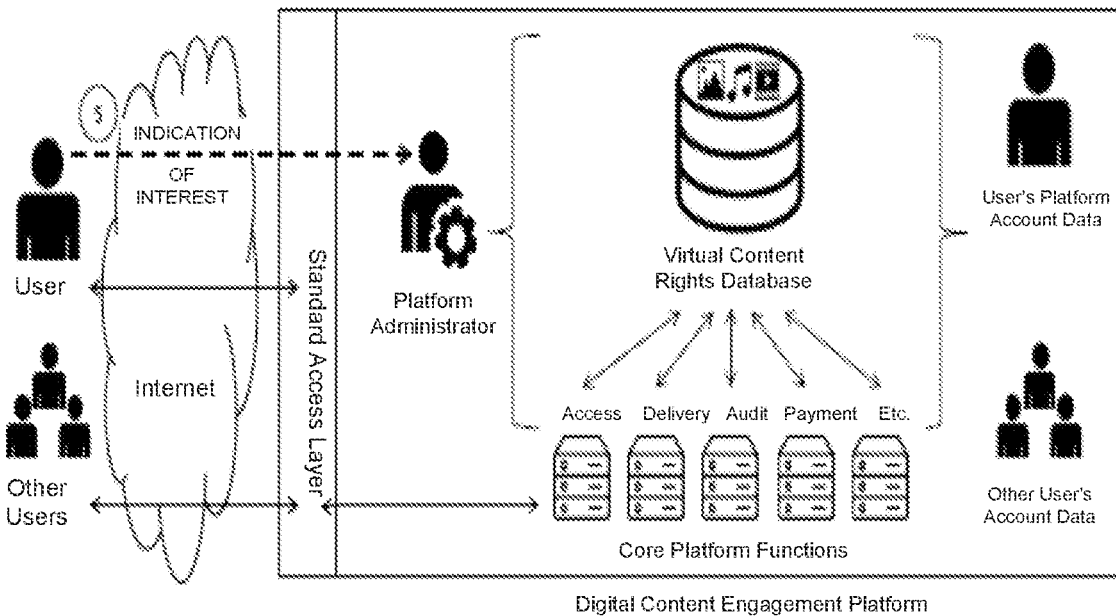
FIG. 5 illustrates step (140) of FIG. 1.

FIG. 5 illustrates step (140) of FIG. 1. In FIG. 5, the user will review such terms and indicate to the platform administrator which set of terms, if any, is acceptable to the user as consideration for securing the virtual content right in question.

The user will be able to assess the offer based upon numerous factors, including data provided from the platform administrator relating to the performance qualities of the music-related digital content asset sought (e.g., revenues generated, play counts, biographical information relating to the creator of the music-related digital content, previous holders of the music-related digital content assets).

Figure 6:
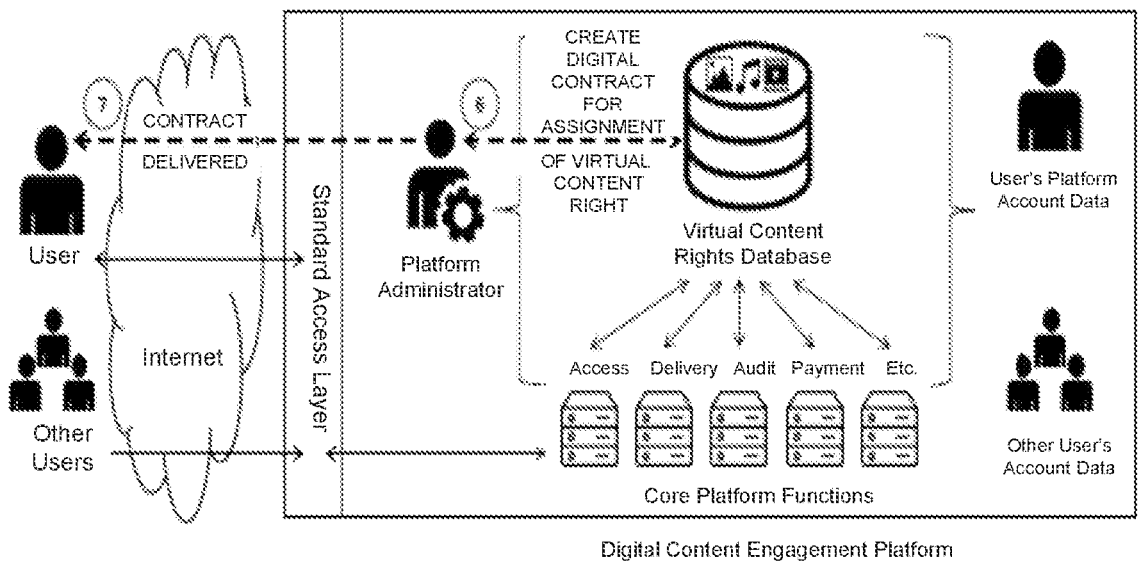
FIG. 6 illustrates step (150) of FIG. 1.

FIG. 6 illustrates step (150) of FIG. 1. In FIG. 6, where the user indicates to the platform administrator that a set of terms is acceptable, a digital contract summarizing the assignment of such virtual content right shall be created by the platform administrator and delivered to the user for acceptance.

The digital contract to be crafted utilizes the appropriate platform components, likely to include the virtual content rights database, the purchasing user's platform account data, the selling user's account data, and one or more access, audit, and payment databases supporting the platform generally.

Figure 7:
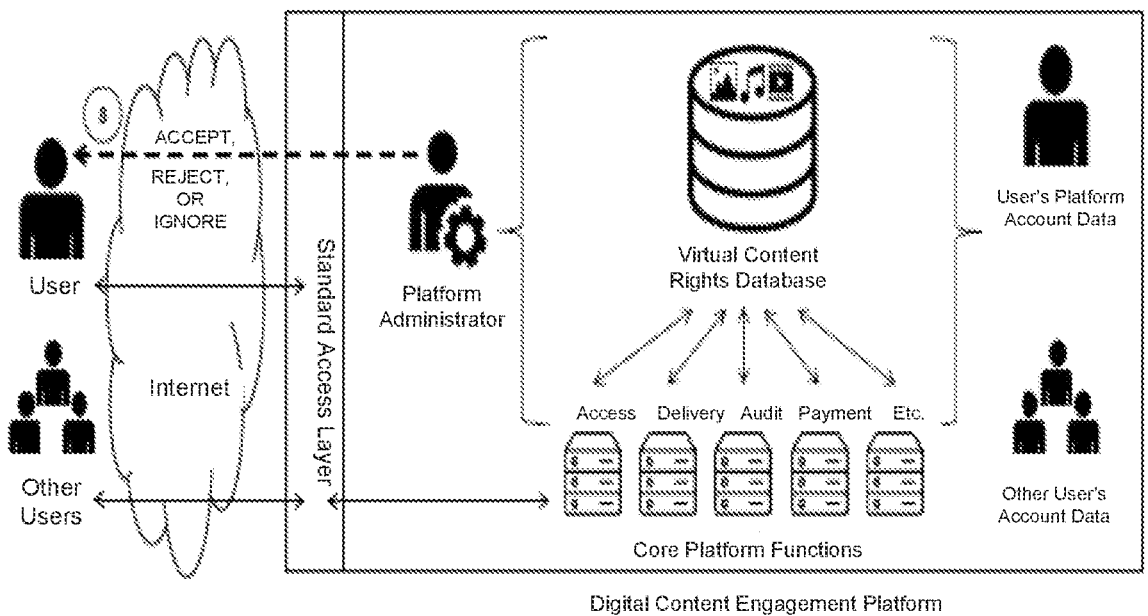
FIG. 7 illustrates step (160) of FIG. 1.

FIG. 7 illustrates step (160) of FIG. 1. In FIG. 7, the user then is free to agree to, reject, or ignore the digital contract received from the platform administrator. The user may also be able to counter-offer (technically a rejection followed by new offer) to the holder of the virtual content right, whether it be the platform administrator or another user.

Offers may also be held open for a given period of time, whether at the direction of the platform administrator or the other user controlling such rights. Offers may also be held open for longer periods of time where the user pays consideration to keep such offer open (an option mechanic). Rejected offers may or may not result in the offer being made available to other users, or may require the rights holder to re-confirm the terms for assignment.

Figure 8:
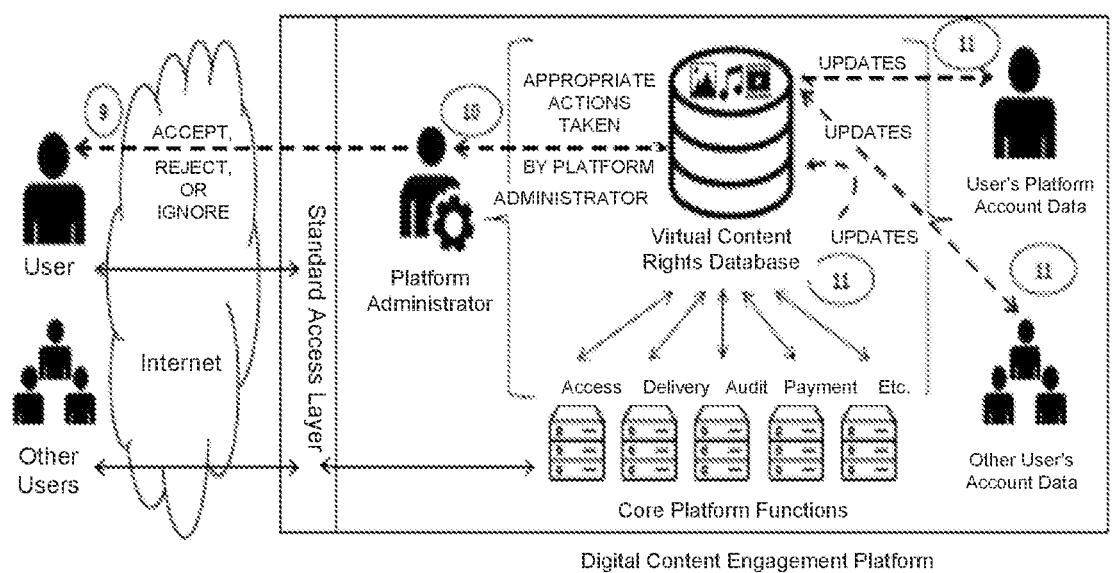
FIG. 8 illustrates step (170) of FIG. 1.

FIG. 8 illustrates step (170) of FIG. 1. In FIG. 8, should user agree to the digital contract, the terms therein may be memorialized within the virtual content rights database and the agreed upon virtual content rights can be assigned to the user for the life of the digital contract.

Recordation may be to an internal database or external database, including but not limited to blockchain databases to support music-related digital asset management.

The right assigned to the user may be retained one or more of: permanently; temporarily (subject to time limit, maintenance fee payments, satisfaction of maintenance actions by the user, etc.); or disposable at the option of the user (gifting to another, selling to another for cash or virtual currency, trading for other in-kind digital or non-music-related digital asset(s), etc.).

Future assignments, disposals, etc. are to be recorded in the virtual content rights database.

Figure 9:
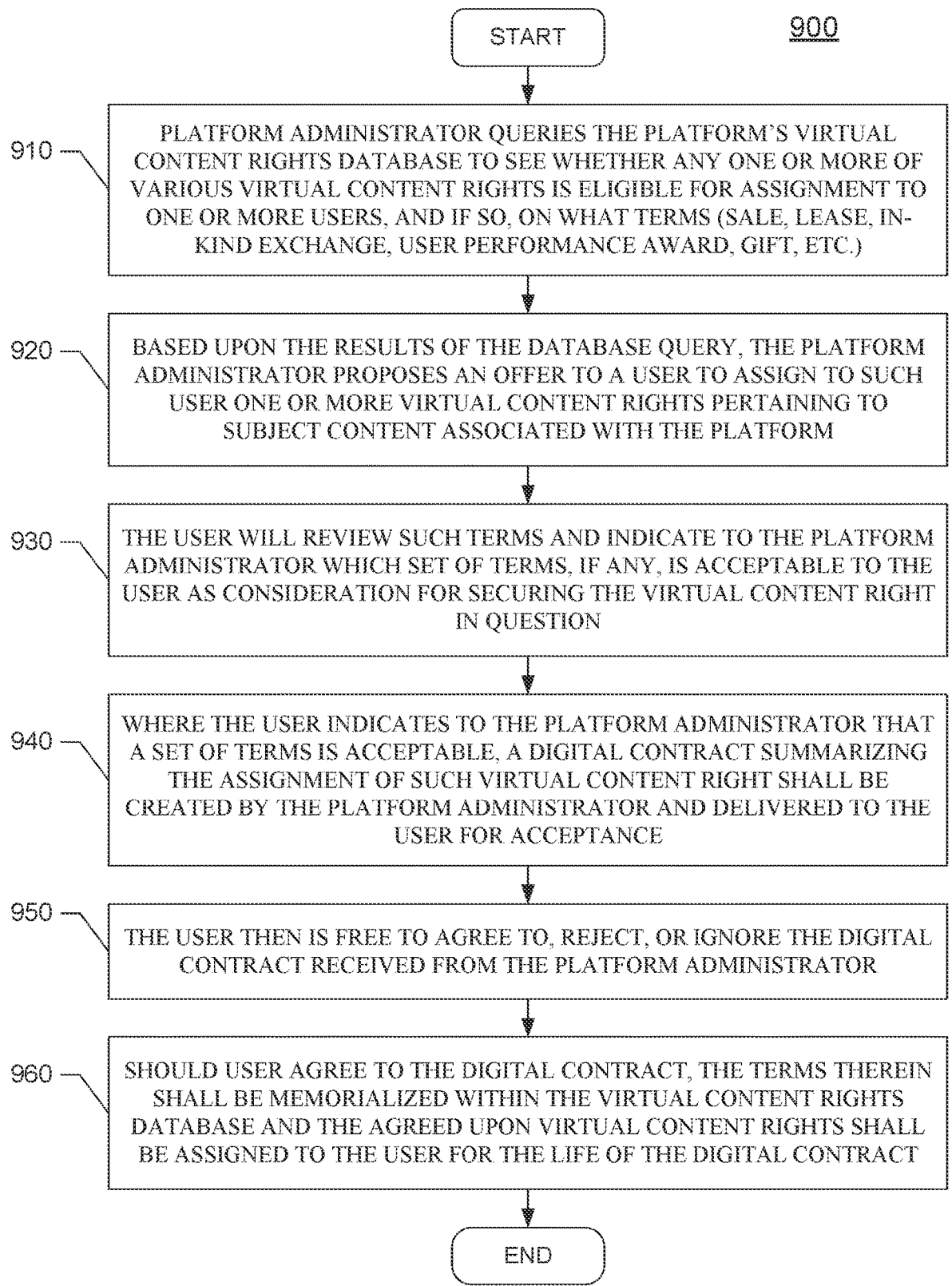
FIG. 9 shows an overview of steps involved with a platform administrator request.

FIG. 9 shows an overview of steps involved with a platform administrator request, including: start virtual content right process; (910) platform administrator queries the platform's virtual content rights database to see whether any one or more of various virtual content rights is eligible for assignment to one or more users, and if so, on what terms (sale, lease, in-kind exchange, user performance award, gift, etc.); (920) based upon the results of the database query, the platform administrator proposes an offer to a user to assign to such user one or more virtual content rights pertaining to subject content associated with the platform; (930) the user will review such terms and indicate to the platform administrator which set of terms, if any, is acceptable to the user as consideration for securing the virtual content right in question; (940) Where the user indicates to the platform administrator that a set of terms is acceptable, a digital contract summarizing the assignment of such virtual content right shall be created by the platform administrator and delivered to the user for acceptance; (950) the user then is free to agree to, reject, or ignore the digital contract received from the platform administrator; (960) should user agree to the digital contract, the terms therein shall be memorialized within the virtual content rights database and the agreed upon virtual content rights shall be assigned to the user for the life of the digital contract; and Stop virtual content right process.

The platform can accept and support a broad range of music-related content types and combinations, which include, but aren't limited to music-related audio recordings (e.g., music), music-related video recordings (e.g., film, TV, web shows), music-related static imagery (e.g., photos, paintings, digitized art), music-related live streamed content, combinations of various mediums, music-related digital virtual real estate, music-related digital virtual goods, and analogous.

There are numerous embodiments of virtual content rights contemplated by the system, which may include one or more of the following:

Administrative Right: A virtual content right which grants the user the right to dictate rules or permissions in regards to how a piece of content can be used within the platform. For example, if a user acquired the virtual administrative right to a song, they could determine and set rules upon which other users of the platform must adhere to in order to play that song.

Reward Right: A virtual content right where the user accrues certain benefits and status within the virtual environment when their associated music-related digital asset performs a certain way (a) within the virtual environment and/or (b) in the real world.

Scarcity Right: A virtual content right where a music-related digital asset (such as a song) may only have one or limited number of ownership slots available within the platform. For example, if Song A had 10 ownership slots available, no more than 10 users could acquire those slots.

These virtual content rights can be combined in any way at the platform administrator's discretion.

There are numerous embodiments and use cases contemplated by this system, with implementations including the following:

All music-related digital content types and combinations, including but not limited to music-related audio recordings (e.g., music), music-related video recordings (e.g., film, TV, web shows), music-related static imagery (e.g., photos, paintings, digitized art), music-related live streamed content, combinations of various mediums, music-related digital virtual real estate, music-related digital virtual goods, and analogous.

All music-related digital content consumption channels and combinations, including but not limited to desktop-based applications (native applications and web-based), mobile-based applications (native applications and web-based), console-based applications (native applications and web-based), TV set-based applications (native applications and web-based), and appliance-based applications (native applications and web-based).

All music-related digital content consumption platform types and combinations, including but not limited to audio only (e.g., music streaming services), 2D and 3D video (e.g., video games), virtual reality (e.g., video games), augmented reality (e.g., video games), and mixed reality (e.g., video games).

A primary embodiment of the system involves using the music-related digital content asset in a digital virtual environment (akin to Fantasy Football or Fantasy Baseball) where the user holding the virtual content right to that music-related digital content asset accrues certain benefits and status within the virtual environment when their associated music-related digital asset performs a certain way (a) within the virtual environment and/or (b) in the real world.

For instance, where the user is assigned the virtual content right to a piece of digital music that is often played by others within the virtual environment, the user would receive in-world virtual rewards, coins, points, or other status enhancements within the virtual environment each time the music was played within the virtual environment. Similarly, the user might receive additional virtual environment benefits when the music was played in the real world (with such plays verified by Billboard, Spotify, etc.

Notwithstanding these virtual reward payments, the real-world owner of the music-related digital content would still be entitled to their contractual cash payout for each play in the virtual environment or the real world, and the reward activities relating to the virtual content right would not affect these real-world rights and royalty expectations.

Below are further examples of the present disclosure.

In accordance with one aspect, every song has one virtual title holder, which is held by some unique user of the system. For example, say a user Jeff goes into the system and is a big fan of the music of Musician1. Jeff then searches the song 'Musician's Music,' a song by Musician1, and then decides he wants to acquire the virtual title to this song. Using virtual currency, Jeff uses coins or the like to then acquire the virtual title to this song, and he is then subsequently listed as the virtual title holder within the system. So long as Jeff continues to come back into the system, he continues to retain the virtual title. But if he fails to come back in, then the virtual title to that song may be released back to the community where other users can then acquire it.

In one aspect, only one user can claim the "title" to a song. Using the above example, if Jeff has the virtual title to 'Musician's Music,' and then another user, Mark, comes into the system and also likes 'Musician's Music,' he cannot at the moment acquire it because he sees that Jeff is the virtual title holder. Mark then has options, and could (1) make an offer to Jeff to acquire the virtual title to the song from him; (2) join a waiting list to have the opportunity to acquire the virtual title should Jeff allow it to expire or (3) do nothing.

With a user's ownership of virtual title to a song, this would not restrict other users from playing the song, as it would still be playable like any other song. Mark could also build his own "music room" (e.g., a virtual room called say "Mark's Music Listening Room") and make the song available in that virtual room, or it could be in say a Metal Themed Music Listening Room. In one aspect of the system, every time the song is played anywhere in the system, Jeff, the title holder, would get rewarded, such as moving up levels as a system user or be provided with other rewards. Thus, with the present system there is also competitive incentive to have the virtual title to popular songs and/or music videos within the system.

As new songs and/or music videos are released with the system, users will be compelled to come into the system to try and acquire the one virtual title available for the song. For example, new releases from popular artists may be highly desirable to acquire. Even for legacy or tail content, there will still be competition within niche areas or neighborhoods of the system, such as perhaps a "metal" genre neighborhood may be competitive for acquiring legacy Musician1 songs and/or music videos.

Figure 10A:
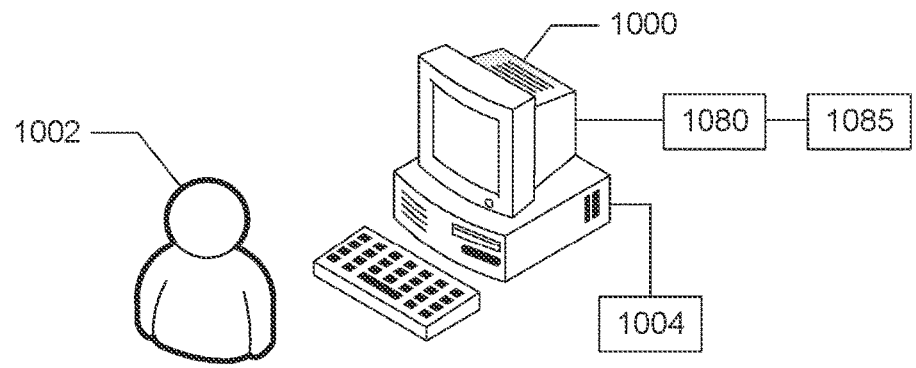
FIG. 10A is a representation of a computer system and a user in accordance with an implementation of the present disclosure.

FIG. 10A is a representation of a computer system 1000 and a user 1002 in accordance with an implementation of the present disclosure. The user 1002 uses the computer system 1000 to implement a digital content access management application 1090 as illustrated and described with respect to method 100 in FIG. 1 and method 900 in FIG. 9.

Figure 10B:
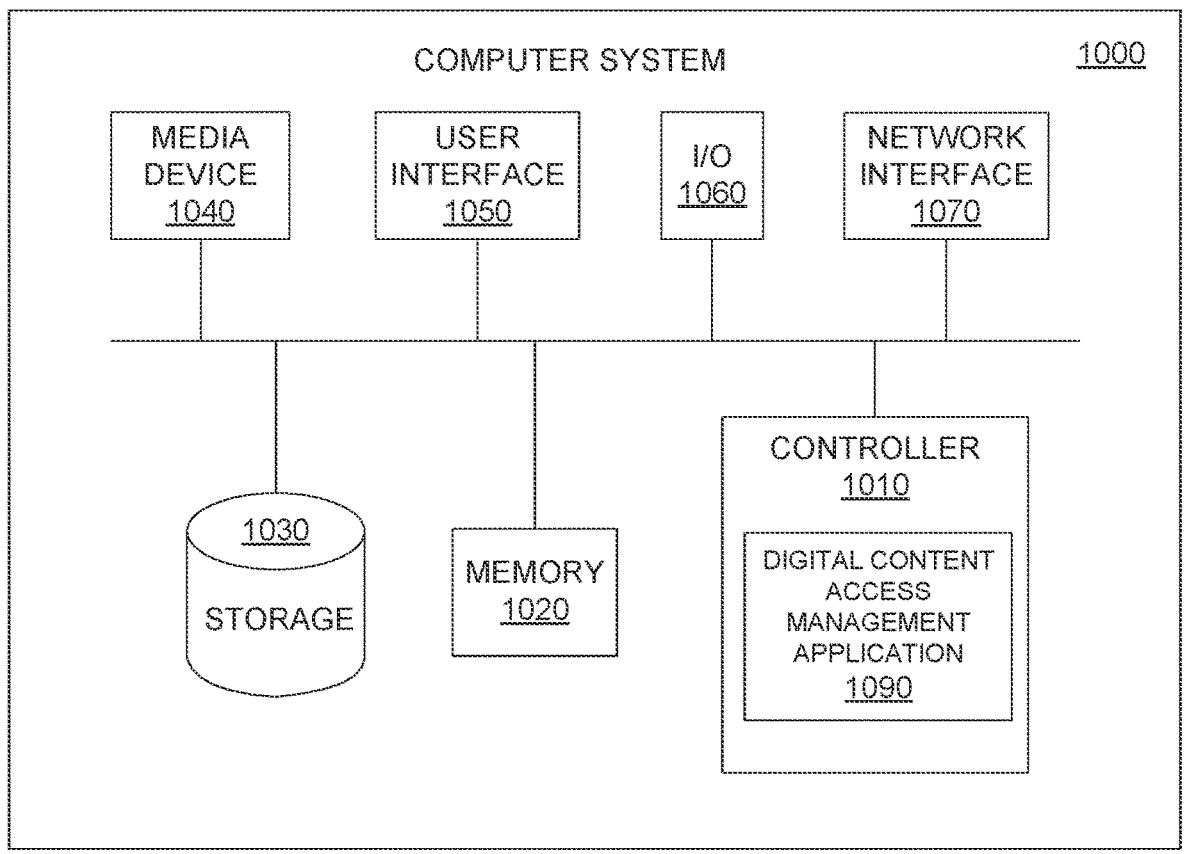
FIG. 10B is a functional block diagram illustrating the computer system hosting the digital content access management application in accordance with an implementation of the present disclosure.

The computer system 1000 stores and executes the digital content access management application 1090 of FIG. 10B. In addition, the computer system 1000 may be in communication with a software program 1004. Software program 1004 may include the software code for the digital content access management application 1090. Software program 1004 may be loaded on an external medium such as a CD, DVD, or a storage drive, as will be explained further below.

Furthermore, computer system 1000 may be connected to a network 1080. The network 1080 can be connected in various different architectures, for example, client-server architecture, a Peer-to-Peer network architecture, or other type of architectures. For example, network 1080 can be in communication with a server 1085 that coordinates engines and data used within the digital content access management application 1090. Also, the network can be different types of networks. For example, the network 1080 can be the Internet, a Local Area Network or any variations of Local Area Network, a Wide Area Network, a Metropolitan Area Network, an Intranet or Extranet, or a wireless network.

FIG. 10B is a functional block diagram illustrating the computer system 1000 hosting the digital content access management application 1090 in accordance with an implementation of the present disclosure. A controller 1010 is a programmable processor and controls the operation of the computer system 1000 and its components. The controller 1010 loads instructions (e.g., in the form of a computer program) from the memory 1020 or an embedded controller memory (not shown) and executes these instructions to control the system. In its execution, the controller 1010 provides the digital content access management application 1090 with a software system, such as to enable the creation and configuration of engines and data extractors within the asset managing application 1090. Alternatively, this service can be implemented as separate hardware components in the controller 1010 or the computer system 1000.

Memory 1020 stores data temporarily for use by the other components of the computer system 1000. In one implementation, memory 1020 is implemented as RAM. In one implementation, memory 1020 also includes long-term or permanent memory, such as flash memory and/or ROM.

Storage 1030 stores data either temporarily or for long periods of time for use by the other components of the computer system 1000. For example, storage 1030 stores data used by the digital content access management application 1090. In one implementation, storage 1030 is a hard disk drive.

The media device 1040 receives removable media and reads and/or writes data to the inserted media. In one implementation, for example, the media device 1040 is an optical disc drive.

The user interface 1050 includes components for accepting user input from the user of the computer system 1000 and presenting information to the user 1002. In one implementation, the user interface 1050 includes a keyboard, a mouse, audio speakers, and a display. The controller 1010 uses input from the user 1002 to adjust the operation of the computer system 1000.

The I/O interface 1060 includes one or more I/O ports to connect to corresponding I/O devices, such as external storage or supplemental devices (e.g., a printer or a PDA). In one implementation, the ports of the I/O interface 1060 include ports such as: USB ports, PCMCIA ports, serial ports, and/or parallel ports. In another implementation, the I/O interface 1060 includes a wireless interface for communication with external devices wirelessly.

The network interface 1070 includes a wired and/or wireless network connection, such as an RJ-45 or "Wi-Fi" interface (including, but not limited to 802.11) supporting an Ethernet connection.

The computer system 1000 includes additional hardware and software typical of computer systems (e.g., power, cooling, operating system), though these components are not specifically shown in FIG. 10B for simplicity. In other implementations, different configurations of the computer system can be used (e.g., different bus or storage configurations or a multi-processor configuration).

Figure 11:
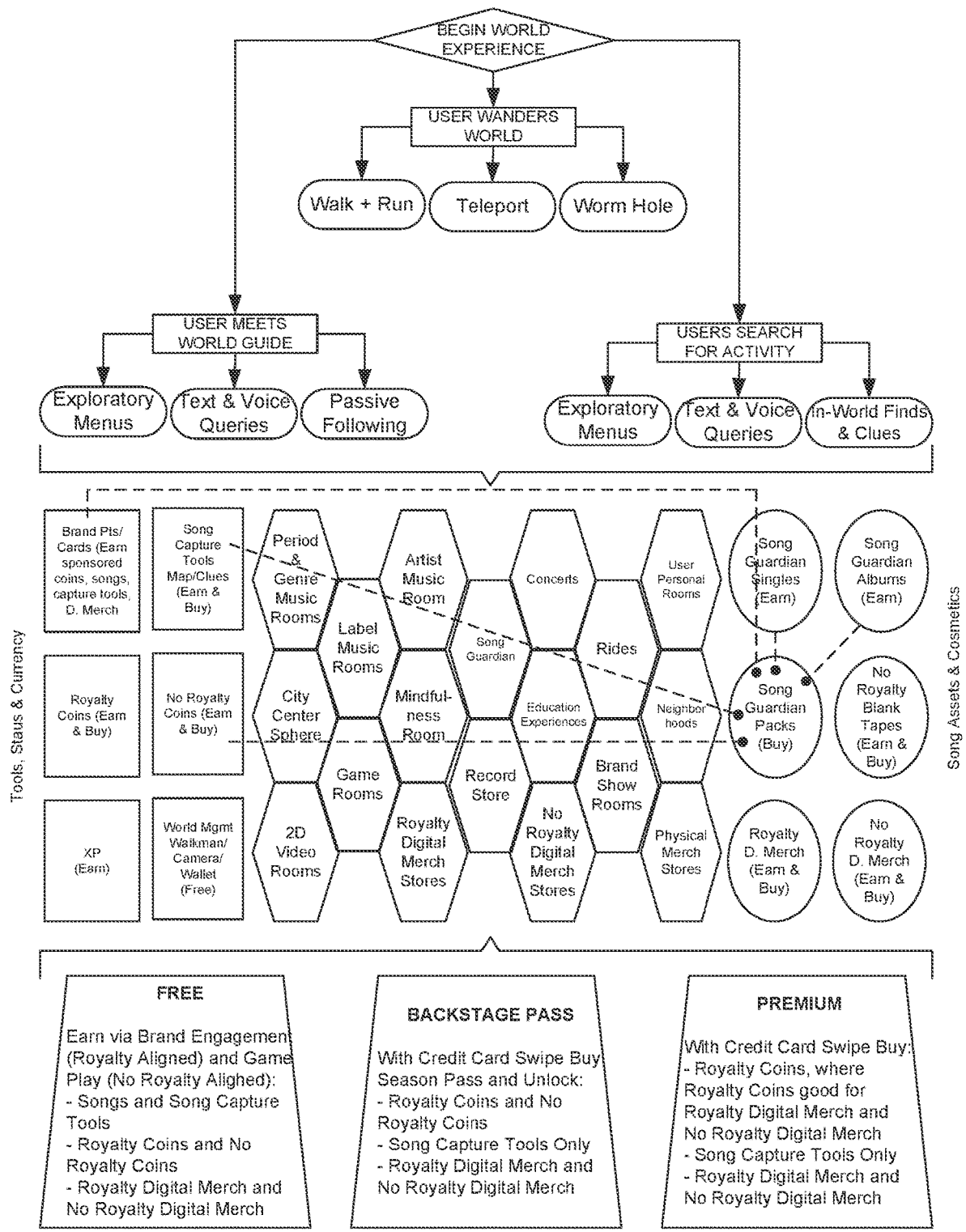
FIG. 11 illustrates an example of relationships among aspects of virtual music world.

FIG. 11 illustrates an example of relationships among aspects of virtual music world including the Song Guardian features in accordance with one implementation of the present disclosure. When assessing the value of the Song Guardian features, the interplay between the Song Guardian features and the other features within the virtual music world can be examined. The illustrated implementation of FIG. 11 illustrates a simplified block diagram representing some of the core features of a virtual music-themed world, including but not limited to coin usage, point collections, and virtualized in-world objects (e.g. Walkman devices, wallets, etc.). In the case of the Song Guardian "Packs" (which may be packaged within the virtual world as a single song, multiple songs, or album representations) that are made available to users, they enhance various aspects within the virtual world relating to user-brand interactions, gamification elements, and reward and payment elements.

Figure 12:
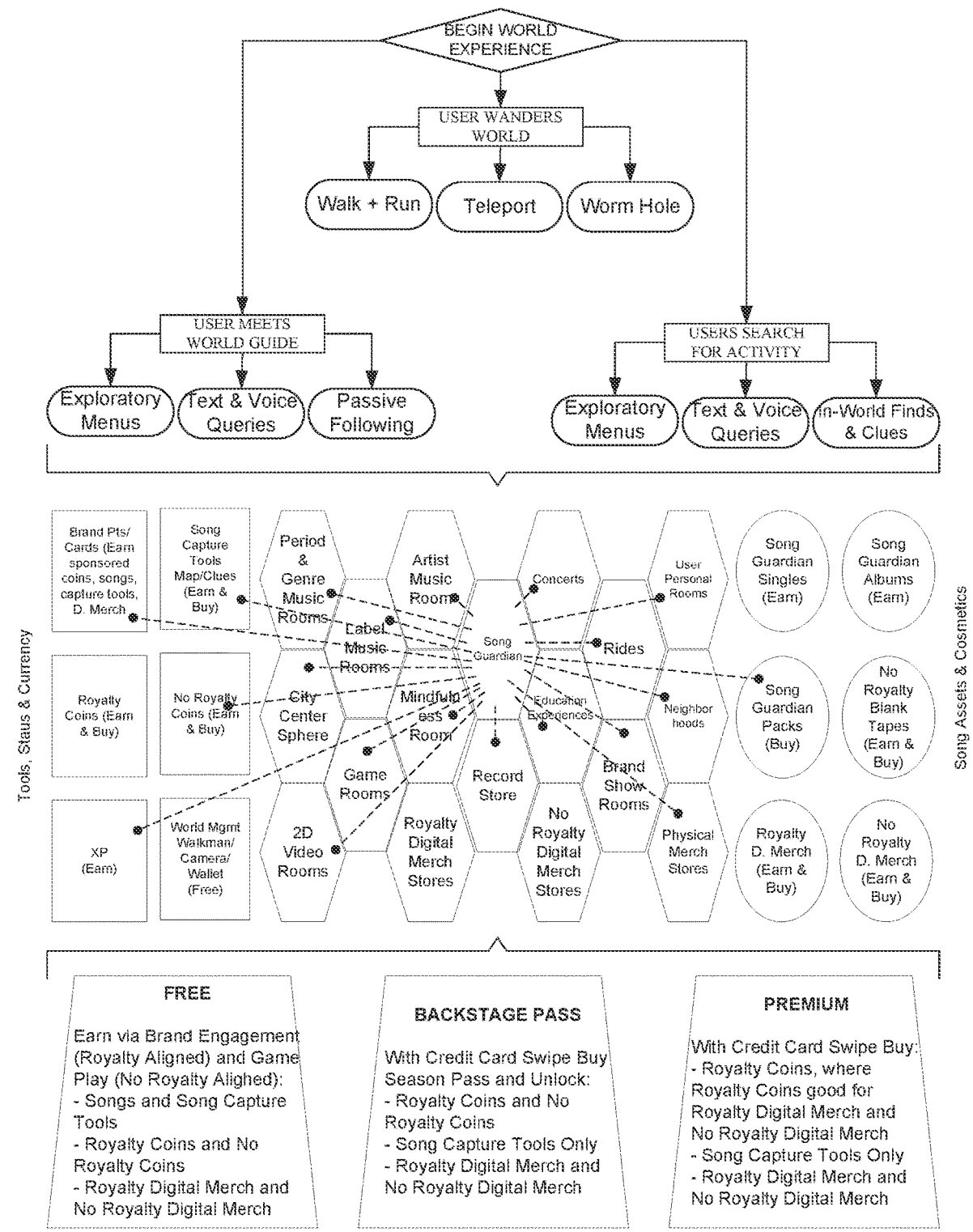
FIG. 12 illustrates an example of relationships among aspects of virtual music world.

FIG. 12 illustrates an example of relationships among aspects of virtual music world in accordance with another implementation of the present disclosure. Similarly, FIG. 12 shows how the Song Guardian user experience can be tied to and enhance a variety or in-world functions (e.g., rewarding points to users), experiences (e.g., music listening rooms, mindfulness rooms, digital stores), and associated Song Guardian activities (e.g., releases of subsequent Song Guardian Packs).

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. For example, variations to the virtual environment include augmented reality (AR) environments, online environments (MMO, social networks, etc.), and mobile companions to AR/virtual environments. Variations to the content include contents other than songs (e.g., video, images, digital object collections, and mixed types). Other variations include editing of objects in collections (e.g., changing, combining, original content) and uniqueness restrictions, scarcity. Thus, the present disclosure is not intended to be limited to the implementations shown herein but is to be accorded the widest scope consistent with the principal and novel features disclosed herein.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

Song Guardian Aspects

Song Guardian Aspects
The computer system that can support a game framework (referred herein as "Song Guardian") built across a virtual music-themed world ("World", "Virtual World", or "Platform"), with such functions accruing benefits to one or more of the Platforms, the users of the Platform ("Users"), music-themed digital content owners and producers, third-parties, and the advertisers. In this regard, the following are contemplated:

The computer system to support Users participating in a Song Guardian "Masters" Virtual World game, where a User can claim fictional in-world ownership rights to administer a song, music video, or similar music-themed digital content element ("Music-Themed Digital Asset") within the Virtual World. In the course of being such fictional owner, the User can:

Earn digital royalty (e.g., Virtual World loyalty points) based on each of their Music-Themed Digital Asset plays or User engagements within the Virtual World.

Need to give other non-administrator Users permission to include the Music-Themed Digital Asset in their own use of the Virtual World (e.g., inclusion in a User's own mixtape).

Sell or trade an administered Music-Themed Digital Asset for digital currency or another Music-Themed Digital Asset.

Lose their administration rights to a Music-Themed Digital Asset title based on lack of activity or failure to pay rents on the owned content.

Claim up to X number of Music-Themed Digital Asset titles to administer, with such ceiling based upon achievement, other User play counts, use of the Music-Themed Digital Asset in mix tapes, etc.

Claim up to X number of Music-Themed Digital Asset titles to administer, subject to approval by the Virtual World operator.

Administer the Music-Themed Digital Asset such that the Music-Themed Digital Asset will contain a history of its origin/provenance.

Search for and connect with others with similar Music-Themed Digital Assets and badge achievements.

Share the Music-Themed Digital Asset within the Virtual World and thereby accelerate the digital royalties earned and increase the number of Music-Themed Digital Assets they may administer (e.g., more Music-Themed Digital Assets slots in their Virtual World wallet).

Vie for certain upcoming popular Music-Themed Digital Assets via lottery (and that that may contain extra physical loot or rewards).

The computer system to support Users participating in a Song Guardian "Limited Editions" Virtual World game, where a User can claim fictional in-world ownership rights to administer a "limited edition" (rarer) song, music video, or similar Music-Themed Digital Asset within the Virtual World. In the course of being such fictional owner, the User can:

Earn digital royalty (e.g., Virtual World loyalty points) based on each of their Music-Themed Digital Asset plays within the Virtual World.

Need to give other non-administrator Users permission to include the Music-Themed Digital Asset in their mixtape.

Sell or trade an administered Music-Themed Digital Asset for digital currency or another Music-Themed Digital Asset.

Lose their administration rights to a Music-Themed Digital Asset title based on lack of activity or failure to pay rents on the owned content.

Claim up to X number of Music-Themed Digital Asset titles to administer, with such ceiling based upon achievement, other User play counts, use of the Music-Themed Digital Asset in mix tapes, etc.

Claim up to X number of Music-Themed Digital Asset titles to administer, subject to approval by the Virtual World operator.

Administer the Music-Themed Digital Asset such that the Music-Themed Digital Asset will contain a history of its origin/provenance.

Search for and connect with others with similar Music-Themed Digital Assets and badge achievements.

Share the Music-Themed Digital Asset within the Virtual World and thereby accelerate the digital royalties earned and increase the number of Music-Themed Digital Assets they may administer (e.g., more Music-Themed Digital Assets slots in their Virtual World wallet).

Vie for certain upcoming popular Music-Themed Digital Assets via lottery (and that that may contain extra physical loot or rewards).

Music-Themed Digital Assets typically cannot be purchased—instead earned or found in the World. Exception may be for distribution through Backstage Pass for Song Guardian Packet. Music-Themed Digital Asset s may be found more quickly by those with better "Tools" (radar/x-ray vision/maps/clues)—all things that can be earned through continued play.

If User finds or earns a Music-Themed Digital Asset "Map" tool (or radar, clues, etc.) that User may save it in their wallet and only use it when the Platform Administrator announces that some really cool/rare songs are being released into the World.

Trivia should be an aspect of Song Guardian collection/competition.

Tools may also be awarded as part of Backstage Pass and/or purchased with coins (Royalty Coins and No Royalty Coins).

Special Song Guardian Music-Themed Digital Assets to be given by Brand Sponsors for brand engagement (e.g., the Music-Themed Digital Asset itself, or a token to select from a collection of brand sponsored Music-Themed Digital Assets).

Song Guardian Music-Themed Digital Assets earn for the User both (i) XP and (ii) Coins (likely No Royalty coins) based upon the number of times the Music-Themed Digital Asset is listened to and/or consumed within in the Virtual World by another User (e.g., listened to in a User's personal room, on a mixtape). No plays by the Music-Themed Digital Asset owner nor the Platform Administrator shall count (no gaming the system).

Users with higher XP scores may hold more Music-Themed Digital Assets and earn more XP and Coins for Music-Themed Digital Assets played.

Music-Themed Digital Assets that are songs may be found in the World as "singles" and eventually accrue with other singles into a completed "album" that can thereafter earn the User new rewards/XP/privileges/faster progression.

Music-Themed Digital Asset combinations (e.g., three songs that all made the Top Ten on Billboard) held by a User may result in perpetual or one-off privileges (the combination generates a "key" to a new experience, or grants the User more XP for those combines songs, etc.).

Music-Themed Digital Assets that the User is tired of holding may be exchanged for No Royalty Coins and/or No Royalty Digital Merch in the Record Store.
  When a Music-Themed Digital Asset is exchanged, the User is afforded an added "album sleeve" or Music-Themed Digital Asset "slot" to hold a new to be found/earned Music-Themed Digital Asset.
  Allow User to hold an "extra" Music-Themed Digital Asset for a set period of time to allow them time to decide which Music-Themed Digital Asset to give up to make room for a new better Music-Themed Digital Asset that they can put into their wallet.

Each User likely to be able to hold many dozens of Music-Themed Digital Assets (maybe start with 10 and progress up to 100).

The same Music-Themed Digital Asset may be held by multiple Users, but scarcity shall be a factor. For instance:
  Class A with Music-Themed Digital Asset release rates of only 1% relative to general User population;
  Class B with Music-Themed Digital Asset release rates of only 5% relative to general User population;
  Class C with Music-Themed Digital Asset release rates of only 10% relative to general User population;
  Etc.

Different classes of Music-Themed Digital Assets will pay out different XP and coin rates depending on play counts in the World. For instance:
  Class A Music-Themed Digital Asset songs may pay out 100 XP and 100 Coins for each play (the accruals to be shared evenly each month to the holders of the song at the payout date (similar to how a stock dividend is paid on its "owner of record" date);
  Class B Music-Themed Digital Asset songs may pay out 50 XP and 50 Coins for each play (the accruals to be shared evenly each month to the holders of the song at the payout date (similar to how a stock dividend is paid on its "owner of record" date);
  Class C Music-Themed Digital Asset songs may pay out 10 XP and 10 Coins for each play (the accruals to be shared evenly each month to the holders of the song at the payout date (similar to how a stock dividend is paid on its "owner of record" date);
  Etc.

The Platform Administrator may also encourage Users to share info about their Music-Themed Digital Assets by awarding XP or other benefits when a User posts to others inside the World or outside the World.

For example, in such a system involving songs as the digital content, every song can be provided with a single virtual title holder held by a unique User of the system. To acquire the digital asset, a User can enter the system, search for a digital asset (e.g., a song), and then decide to acquire the virtual title to the digital asset. The User can then use the Platform to acquire the virtual title to this digital asset, such as by use of game play effort, payment of virtual currency, trades, credits, etc., and would then subsequently be listed as the virtual title holder in the system. For motivation to stay engaged with and use the system, so long as the User continues to come back into the system, the User can continue to retain the virtual title to the digital asset, but if the User fails to come back into the system, then the virtual title to that digital asset may be released back to the community where other Users can then acquire it.

In one aspect of the present disclosure, only one User can claim virtual title to a digital assist such as a song. Namely, if User A has the virtual title to Song 1, and then another User B who seeks to acquire title to Song 1 cannot do so, at the moment, because User B would see that User A is the holder of the virtual title. User B, however, may be provided with options such as (1) making an offer to User A to acquire the virtual title to the digital asset; (2) join a waiting list to have the opportunity to acquire the virtual title should User A allow it to expire, or (3) do nothing.

In one aspect, a User's ownership of virtual title to a digital asset such as a song would not restrict other Users from playing the digital asset, as it would still be playable like any other song. Owners could also build their own "music rooms" (e.g., a virtual room called say "User A's Music Listening Room") and make the digital asset available in that virtual room, or it could be located into a themed listening room matching the genre of the digital asset.

In one aspect of the system, every time a titled song is played anywhere in the system, the title holder would get rewarded, such as moving up levels as a system User or receiving points or other rewards. Thus, with the present system there is competitive incentive to have the virtual title to popular songs within the system. As new songs are released with the system, Users can be motivated to come into the system to try and acquire the one virtual title available for the digital asset. For example, new releases from popular artists may be highly desirable to acquire.

In some aspects of the present system, limits can be placed on the number of digital assets (e.g., songs) a User can hold virtual title to, such as five songs. In one aspect, each digital asset in the system has one virtual title holder who must be a User of the system. Alternatively, the system could allow a digital asset to have multiple virtual title owners. For example, 100 Users could be permitted to have the virtual title to a single song.

The present system provides improvement over prior systems by using virtual content rights to digital content to create competition, incentive, and envy among Users to spur more usage and engagement within the system, and can create new ways to monetize User and super Users or fans.

One aspect of the present disclosure provides a computer-implemented method for management of virtual content rights of digital assets comprising:
  providing a virtual content rights database comprising data associating Users of a digital content engagement Platform with Users' virtual content rights acquired with respect to digital assets;
  receiving, at a Platform administrator server, data indicative of a request from a User for assignment of virtual content rights of a digital asset;
  determining, by the Platform administrator server, whether the requested virtual content rights are eligible for assignment to the User and the terms of the assignment if eligible;
  notifying, by the Platform administrator server, the User of the availability and a set of terms for the User to acquire the virtual content rights, the terms including duration of the assignment;

receiving, by the Platform administrator server, data from the User indicative of which of the terms are acceptable to the User as consideration for securing the virtual content rights;

sending, by the Platform administrator server to the User, data representing a digital contract based on the terms indicated to be acceptable to the User, the digital contract providing for assignment of the virtual content rights to the User in accordance with one or more of the accepted terms;

receiving, by the Platform administrator server, data indicative of agreement by the User to the digital contract; and updating, by the Platform administrator server, the virtual content rights database to indicate the assignment of the virtual content rights to the User for the duration specified in the digital contract.

Another aspect of the present disclosure provides a computer-implemented method for management of virtual content rights of digital assets comprising:

providing a User access portal for a User to interact with a digital content engagement Platform that includes a virtual content rights database comprising data associating Users of the digital content engagement Platform with Users' virtual content rights acquired with respect to digital assets;

sending request information entered by the User via the access portal to the Platform administrator server, the request information including data representing a User request for assignment of virtual content rights of a digital asset;

receiving data via the access portal indicative of notification of the availability and a set of terms for the User to acquire the virtual content rights, the terms including duration of the assignment;

sending acceptance information entered by the User via the access portal to the Platform administrator server, the acceptance information including data representing which of the terms are acceptable to the User as consideration for securing the virtual content rights;

receiving data via the access portal representing a digital contract based on the terms indicated to be acceptable to the User, the digital contract providing for assignment of the virtual content rights to the User in accordance with one or more of the accepted terms; and sending agreement information entered by the User via the access portal to the Platform administrator server, the agreement information including data representing agreement by the User to the digital contract.

Basic method steps and variables involved in a User of a multi-User digital content engagement Platform seeking to obtain virtual content rights to a digital asset are shown in FIG. 1 through FIG. 8.

The Platform can accept and support a broad range of music-themed digital content types and combinations, which include, but aren't limited to audio recordings (e.g., music), video recordings (e.g., film, TV, web shows), static imagery (e.g., photos, paintings, digitized art), live streamed content, combinations of various mediums, digital virtual real estate, digital virtual goods, and analogous.

There are numerous embodiments of Virtual Content Rights contemplated by the system, which may include one or more of the following:

Administrative Right: A Virtual Content Right which grants the User the right to dictate rules or permissions in regards to how a piece of content can be used within the Platform. For example, if a User acquired the virtual administrative right to a digital asset (e.g., a song), they could determine and set rules upon which other Users of the Platform must adhere to in order to play that song.

Reward Right: A Virtual Content Right where the User accrues certain benefits and status within the virtual music World when their associated digital asset performs a certain way (a) within the virtual music World and/or (b) in the real World.

Scarcity Right: A Virtual Content Right where a digital asset (such as a digital asset (e.g., a song)) may only have one or limited number of ownership slots available within the Platform. For example, if Song A had 10 ownership slots available, no more than 10 Users could acquire those slots.

These Virtual Content Rights can be combined in any way at the Platform Administrator's discretion.

There are numerous embodiments and use cases contemplated by this system, with implementations including the following:

All music-themed digital content types and combinations, including but not limited to audio recordings (e.g., music), video recordings (e.g., film, TV, web shows), static imagery (e.g., photos, paintings, digitized art), live streamed content, combinations of various mediums, digital virtual real estate, digital virtual goods, and analogous.

All music-themed digital content consumption channels and combinations, including but not limited to desktop-based applications (native applications and web-based), mobile-based applications (native applications and web-based), console-based applications (native applications and web-based), TV set-based applications (native applications and web-based), and appliance-based applications (native applications and web-based).

All music-themed digital content consumption Platform types and combinations, including but not limited to audio only (e.g., music streaming services), 2D and 3D video (e.g., video games), virtual music World (e.g., video games), augmented reality (e.g., video games), and mixed reality (e.g., video games).

A primary embodiment of the system involves using the music-themed digital content asset in a "virtual music World" digital environment (akin to Fantasy Football or Fantasy Baseball) where the User holding the Virtual Content Right to that music-themed digital content asset accrues certain benefits and status within the virtual music World when their associated digital asset performs a certain way (a) within the virtual music World and/or (b) in the real World.

For instance, where the User is assigned the Virtual Content Right to a piece of digital music that is often played by others within the virtual music World, the User would receive in-world virtual rewards, coins, points, or other status enhancements within the virtual music World each time the music was played within the virtual music World. Similarly, the User might receive additional virtual music World benefits when the music was played in the real-world (with such plays verified by Billboard, Spotify, etc).

Notwithstanding these virtual reward payments, the real-world owner of the music-themed digital content would still be entitled to their contractual cash payout for each play in the virtual music World or the real World, and the reward activities relating to the Virtual Content Right would not affect these real-world rights and royalty expectations.

Below are further examples of the present disclosure.

In accordance with one aspect, every song has one virtual "Title Holder," which is held by some unique User of the system. For example, say a User Jeff goes into the system and is a big fan of the music of Artist X. Jeff then searches the digital asset Song A, a digital asset (e.g., a song) by Artist X, and then decides he wants to acquire the virtual title to this digital asset. Using virtual currency, Jeff uses coins or the like to then acquire the virtual title to this digital asset, and he is then subsequently listed as the virtual title holder within the system. So long as Jeff continues to come back into the system, he continues to retain the virtual title. But if he fails to come back in, then the virtual title to that song may be released back to the community where other Users can then acquire it.

In one aspect, only one User can claim the "title" to a digital asset (e.g., a song). Using the above example, if Jeff has the virtual title to Song A and then another User, Mark, comes into the system and also likes Song A, he cannot at the moment acquire it because he sees that Jeff is the virtual title holder. Mark then has options, and could (1) make an offer to Jeff to acquire the virtual title to the digital asset from him; (2) join a waiting list to have the opportunity to acquire the virtual title should Jeff allow it to expire or (3) do nothing.

With a User's ownership of virtual title to a digital asset (e.g., a song), this would not restrict other Users from playing the digital asset, as it would still be playable like any other song. Mark could also build his own "music room" (e.g., a virtual room called say "Mark's Music Listening Room") and make the digital asset available in that virtual room, or it could be in say a Metal Themed Music Listening Room. In one aspect of the system, every time the digital asset is played anywhere in the system, Jeff, the title holder, would get rewarded, such as moving up levels as a system User or be provided with other rewards. Thus, with the present system there is also competitive incentive to have the virtual title to popular songs within the system.

As new songs are released with the system, Users will be compelled to come into the system to try and acquire the one virtual title available for the digital asset. For example, new releases from popular artists may be highly desirable to acquire. Even for legacy or tail content, there will still be competition within niche areas or neighborhoods of the system, such as perhaps a "metal" genre neighborhood may be competitive for acquiring legacy songs from a particular artist.

Further Song Guardian Aspects

In one aspect, a system for managing access to music-themed digital content in a virtual music World environment using virtual content rights is disclosed. The system includes: a virtual content rights database comprising data associating a User of the virtual music World environment with the virtual content rights acquired with respect to the music-themed digital content; a processor to receive a request from a device of the User for assignment of the virtual content rights of the music-themed digital content, wherein the User uses the device to interface with the processor, wherein the virtual content rights database is updated to indicate the assignment of the virtual content rights to the User, the processor to receive data from the device of the User holding the virtual content rights to music-themed digital content including songs to create a virtual mix tape having at least one of the digital assets, wherein the virtual content rights database is updated to indicate sharing of the virtual mix tape by the User within the virtual music World environment.

In one implementation, the processor receives a request to copy the virtual mix tape having the at least one of the digital assets to a blank virtual mix tape to produce a second-generation virtual mix tape. In one implementation, the processor sends permission to the User device that the User is now free to sell, trade, or give away the second-generation virtual mix tape to other Users within the virtual music World environment. In one implementation, the system further includes a User account database including an account of the User to deduct a set amount from the account for the use of the digital assets included in the virtual mix tape owned by other Users. In one implementation, the system further includes a User account database including an account of the User to add a set amount to an account of the User for the use of the music-themed digital content by other Users, wherein the User holds the virtual content rights to the music-themed digital content. In one implementation, the music-themed digital content included in the virtual mix tape further includes at least one of videos, audios, photos, and other media items to personalize the virtual mix tape. In one implementation, the virtual mix 15 tape includes at least one of artworks, logos, writings, and other items to personalize the virtual mix tape.

In another aspect, a non-transitory computer-readable storage medium storing a computer program to manage access to music-themed digital content in a virtual music World environment using virtual content rights is disclosed. The computer program includes executable instructions that cause a computer to: provide a virtual content rights database comprising data associating a User of the virtual music World environment with the virtual content rights acquired with respect to the music-themed digital content; receive a request from a device of the User for assignment of the virtual content rights of the music-themed digital content, wherein the User uses the device to interface with the processor; update the virtual content rights database to indicate the assignment of the virtual content rights to the User; receive data from the device of the User holding the virtual content rights to music-themed digital content including songs to create a virtual mix tape having at least one of the digital assets; and update the virtual content rights database to indicate sharing of the virtual mix tape by the User within the virtual music World environment.

The present disclosure includes the following additional implementations.

In one implementation, the present disclosure relates to computer-implemented systems and methods for creating, transferring and managing digital assets, and more particularly to computer-implemented systems and methods of creating, transferring and managing virtual content rights associated with Music-Themed Digital Assets such as audio or video recordings, virtual mixed music tapes or playlists, static images such as photos, paintings, and digitized art, etc., in a multiUser digital content engagement Platform.

FIG. 1 shows an overview 100 of steps involved with a User request to a Platform Administrator server, including:
Start Virtual Content Right process;
(110) The User of a Digital Content Engagement Platform requests assignment of one or more Virtual Content Rights from the Platform Administrator;
(120) Platform Administrator checks Digital Content Engagement Platform's Virtual Content Rights Database to see whether the requested Virtual Content Right is eligible for assignment to the User, and if so, on what Terms (Sale, Lease, In-Kind Exchange, User Performance Award, Gift, etc.);
(130) If the Virtual Content Right sought is capable of being assigned to the User, the Platform Administrator will notify the User of availability and the Terms (one or more options) for the User to acquire such Virtual Content Right;

(140) The User will review such Terms and indicate to the Platform Administrator which set of Terms, if any, is acceptable to the User as consideration for securing the Virtual Content Right in question;

(150) Where the User indicates to the Platform Administrator that a set of Terms is acceptable, a Digital Contract summarizing the assignment of such Virtual Content Right shall be created by the Platform Administrator and delivered to the User for acceptance;

(160) The User then is free to agree to, reject, or ignore the Digital Contract received from the Platform Administrator;

(170) Should User agree to the Digital Contract, the Terms therein shall be memorialized within the Virtual Content Rights Database and the agreed upon Virtual Content Rights shall be assigned to the User for the life of the Digital Contract; and Stop Virtual Content Right process.

FIG. 2 illustrates step (110) of FIG. 1. In FIG. 2, the User of the digital content engagement Platform requests assignment of one or more virtual content rights from the Platform Administrator server. In one implementation, the "digital content" includes audio recordings (e.g., music), video recordings (e.g., film, TV, web shows), static imagery (e.g., photos, paintings, digitized art), live streamed content, combinations of various mediums, digital virtual real estate, digital virtual goods, and analogous digital content.

In one implementation, a "virtual content right" includes an appropriate right (whether partial to comprehensive) that the Platform Administrator may be permitted to "legally" assign, either permanently or temporarily, to the User, for consideration or otherwise. Examples of a virtual content right includes the right of the User to earn "in-Platform" points or credits whenever another Platform User engages with or consumes the associated content (e.g., another User listens to a digital asset (e.g., a song) that the User has the virtual content right to).

FIG. 3 illustrates step (120) of FIG. 1. In FIG. 3, the Platform Administrator checks digital content engagement Platform's virtual content rights database to see whether the requested virtual content right is eligible for assignment to the User, and if so, on what terms (sale, lease, in-kind exchange, User performance award, gift, etc.).

The terms may include, but are not limited to, the User paying a fee for perpetual or time limited rights over the use of the subject content, the User being assigned such subject rights as consideration for trading some other Platform associated content right(s) previously assigned to the User by the Platform Administrator, the User being assigned such rights as a reward for partaking in a particular in-Platform activity (e.g., winning a sweepstakes, viewing certain ads), the User being assigned such rights for any other reason the Platform Administrator deems appropriate in their discretion as Platform Administrator, or analogous situations meriting the assignment of such rights to the User. The terms may reflect the requirements of the party controlling the virtual content right, which might be the Platform Administrator or another User.

FIG. 4 illustrates step (130) of FIG. 1. In FIG. 4, if the virtual content right sought is capable of being assigned to the User, the Platform Administrator will notify the User of availability and the terms (one or more options) for the User to acquire such virtual content right.

The Platform Administrator may offer one or more options to the User, and may dynamically price such options. By way of example, the Platform Administrator might make the consideration vary depending on the time and manner the right is sought. Similarly, the Platform Administrator might offer the right to one User for consideration "x" and offering the same right to another User for consideration "y", with the delta being determined by the status of each User (one is a higher ranked User compared to the other).

It is also contemplated that the terms are not generated by the Platform Administrator, but by another User that holds the virtual content right in question (and are merely being delivered to the User by the Platform Administrator).

FIG. 5 illustrates step (140) of FIG. 1. In FIG. 5, the User will review such terms and indicate to the Platform Administrator which set of terms, if any, is acceptable to the User as consideration for securing the virtual content right in question.

The User will be able to assess the offer based upon numerous factors, including data provided from the Platform Administrator relating to the performance qualities of the digital content asset sought (e.g., revenues generated, play counts, biographical information relating to the creator of the digital content, previous holders of the digital content assets).

FIG. 6 illustrates step (150) of FIG. 1. In FIG. 6, where the User indicates to the Platform Administrator that a set of terms is acceptable, a digital contract summarizing the assignment of such virtual content right shall be created by the Platform Administrator and delivered to the User for acceptance.

The digital contract to be crafted utilizes the appropriate Platform components, likely to include the virtual content rights database, the purchasing User's Platform account data, the selling User's account data, and one or more access, audit, and payment databases supporting the Platform generally.

FIG. 7 illustrates step (160) of FIG. 1. In FIG. 7, the User then is free to agree to, reject, or ignore the digital contract received from the Platform Administrator. The User may also be able to counter-offer (technically a rejection followed by new offer) to the holder of the virtual content right, whether it be the Platform Administrator or another User.

Offers may also be held open for a given period of time, whether at the direction of the Platform Administrator or the other User controlling such rights. Offers may also be held open for longer periods of time where the User pays consideration to keep such offer open (an option mechanic). Rejected offers may or may not result in the offer being made available to other Users, or may require the rights holder to re-confirm the terms for assignment.

FIG. 8 illustrates step (170) of FIG. 1. In FIG. 8, should User agree to the digital contract, the terms therein may be memorialized within the virtual content rights database and the agreed upon virtual content rights can be assigned to the User for the life of the digital contract.

Recordation may be to an internal database or external database, including but not limited to blockchain databases.

The right assigned to the User may be retained one or more of:
  permanently;
  temporarily (subject to time limit, maintenance fee payments, satisfaction of maintenance actions by the User, etc.); or
  disposable at the option of the User (gifting to another, selling to another for cash or virtual currency, trading for other in-kind digital or non-digital asset(s), etc.).

Future assignments, disposals, etc. are to be recorded in the virtual content rights database.

FIG. 9 shows an overview of steps involved with a Platform Administrator request, including:

Start Virtual Content Right process;
(910) Platform Administrator queries the Platform's Virtual Content Rights Database to see whether any one or more of various Virtual Content Rights is eligible for assignment to one or more Users, and if so, on what Terms (Sale, Lease, In-Kind Exchange, User Performance Award, Gift, etc.);
(920) Based upon the results of the database query, the Platform Administrator proposes an offer to a User to assign to such User one or more Virtual Content Rights pertaining to subject content associated with the Platform;
(930) The User will review such Terms and indicate to the Platform Administrator which set of Terms, if any, is acceptable to the User as consideration for securing the Virtual Content Right in question;
(940) Where the User indicates to the Platform Administrator that a set of Terms is acceptable, a Digital Contract summarizing the assignment of such Virtual Content Right shall be created by the Platform Administrator and delivered to the User for acceptance;
(950) The User then is free to agree to, reject, or ignore the Digital Contract received from the Platform Administrator;
(960) Should User agree to the Digital Contract, the Terms therein shall be memorialized within the Virtual Content Rights Database and the agreed upon Virtual Content Rights shall be assigned to the User for the life of the Digital Contract; and Stop Virtual Content Right process.

The invention claimed is:

1. A method for management of virtual content rights of digital assets for a virtual environment, the method comprising:
    receiving, at a platform administrator server, data indicating a request from a user for assignment of virtual content rights of a digital asset;
    determining, by the platform administrator server, whether the requested virtual content rights are available for assignment to the user and a set of terms of the assignment for the requested virtual content rights, where the platform administrator server accesses a virtual content rights database storing data associating users of a digital content engagement platform with virtual content rights acquired with respect to digital assets and storing data indicating terms for assigning virtual content rights;
    notifying, by the platform administrator server, the user of the availability and the set of terms for the assignment of the virtual content rights to the user;
    receiving, by the platform administrator server, data indicating agreement by the user to the assignment, including agreement to at least one term of the set of terms; and
    updating, by the platform administrator server, the virtual content rights database to indicate the assignment of the virtual content rights to the user.

2. The method of claim 1, where:
the set of terms include a duration of the assignment, and
updating the virtual content rights database includes updating data to indicate the duration of the assignment included in the set of terms.

3. The method of claim 1, further comprising:
receiving, by the platform administrator server, data from the user indicating which of the terms in the set of terms are acceptable to the user as consideration for assigning the virtual content rights;

sending, by the platform administrator server to the user, data representing a digital contract based on the terms indicated to be acceptable to the user, the digital contract providing for assignment of the virtual content rights to the user in accordance with one or more of the accepted terms;
where receiving data indicating agreement by the user to the assignment includes data indicating agreement by the user to the digital contract.

4. The method of claim 1, where:
the virtual content rights for a digital asset include an administrative right that grants the user a right to set permissions for how that digital asset can be used in the platform.

5. The method of claim 1, where:
the virtual content rights for a digital asset include a reward right that indicates a reward the user receives when that digital asset is used in the platform.

6. The method of claim 1, where:
the virtual content rights for a digital asset include a scarcity right that indicates to how many users that virtual content rights for that digital assets can be assigned.

7. The method of claim 1, where:
the digital asset is a music-related digital asset including music-related audio, music-related video, music-related static images including photos, paintings, and digitized art in the digital content engagement platform.

8. The method of claim 7, further comprising:
sharing, viewing, and listening to the music-related digital asset by creating virtual rights to the music-related digital asset.

9. The method of claim 8, where:
the virtual rights are at least one of created, acquired, traded, assigned, and licensed.

10. The method of claim 8, where:
a title holder of the virtual rights is rewarded with a reward.

11. The method of claim 10, where:
the reward includes one of moving up levels as a system user or receiving points.

12. The method of claim 10, further comprising:
promoting competitive incentive to be the title holder of the virtual rights to one of a popular song or music video within the virtual environment.

13. The method of claim 12, where promoting the competitive incentive includes:
providing an incentive for the user to come into the virtual environment to be the title holder of the virtual rights to one virtual title available for the popular song or music video.

14. The method of claim 8, the virtual rights include a limited number of ownership slots available within the virtual environment.

15. A method of managing music rights for a virtual environment, the method comprising:
    retrieving character information from a character database, where the character information is associated with an acquiring character associated with a virtual environment, and the character information includes character rights information;
    retrieving music information from a music database, where the music information is associated with a song, and the music information includes music rights information;
    updating the character rights information based on the music information;

updating the music rights information based on the character information;

receiving first user action information from a first client through a network, where the first user action information indicates the song, and where the first client is associated with a first user;

updating the character information based on the first user action information;

sending the updated character information to a second client through the network, where the second client is associated with a second user.

16. The method of claim 15, where:
the character information includes rewards information, and where updating the character information includes updating the rewards information.

17. The method of claim 15, where:
the character information includes maximum rights information indicating a maximum number of songs that can have music rights information associated with the character information.

18. The method of claim 15, where:
the music information includes rights expiration information indicating at least one time and at least one song.

19. The method of claim 15, where:
the first user action information includes information indicating that the first user has requested access to music audio information for the song.

20. The method of claim 15, further comprising:
retrieving character information from a character database, where the character information is associated with a receiving character associated with the virtual environment, and the character information includes character rights information;

updating the character information associated with the acquiring character to remove music rights information associated with the song;

updating the character information associated with the receiving character to add music rights information associated with the song.

* * * * *